United States Patent [19]

Traister et al.

[11] 4,049,596

[45] Sept. 20, 1977

[54] CORROSION RESISTANT AQUEOUS AND SOLVENT-BASED PRIMER COMPOSITIONS CONTAINING SYNERGISTIC BLENDS OF ZINC BORATE AND BARIUM METABORATE PIGMENTS

[75] Inventors: Andrew Traister, Pittsburgh; Glenn Troup, Sarver, both of Pa.

[73] Assignee: PPG Industries, Inc., Pittsburgh, Pa.

[21] Appl. No.: 628,695

[22] Filed: Nov. 3, 1975

[51] Int. Cl.$^2$ .................... C09D 3/66; C09D 3/80; C09D 5/08
[52] U.S. Cl. ................ 260/18 EP; 106/14; 252/387; 260/22 A; 260/22 CB; 260/23 P; 260/23 AR; 260/28.5 R; 428/418; 428/458; 428/461
[58] Field of Search ............... 106/14; 252/387; 260/22 A, 37 R, 18 EP, 22 CB, 23 AR

[56] References Cited

U.S. PATENT DOCUMENTS

| | | | |
|---|---|---|---|
| 2,809,949 | 10/1957 | Orth | 260/873 |
| 2,899,404 | 8/1959 | Chapin et al. | 260/855 |
| 3,287,142 | 11/1966 | Russell | 106/14 |
| 3,380,836 | 4/1968 | Robinson | 260/22 A |
| 3,829,395 | 8/1974 | Goodell | 260/22 A |

*Primary Examiner*—Ronald W. Griffin
*Attorney, Agent, or Firm*—J. Timothy Keane; Frank J. Troy

[57] ABSTRACT

The addition of blends of zinc borate and barium metaborate pigments to resinous film forming vehicles comprising blends of: (1) an aqueous acrylic latex with an alkyd resin, a styrene allyl alcohol ester adduct or a polymerized dehydrated castor oil product or (2) a solvent-based epoxy ester resin with a chlorinated paraffin; produce primer compositions in which corrosion resistance is synergistically enhanced. The resultant primer compositions may be used on ferrous or non-ferrous metallic substrates such as motor vehicles, appliances, aluminum lawn furniture, etc.

10 Claims, No Drawings

CORROSION RESISTANT AQUEOUS AND SOLVENT-BASED PRIMER COMPOSITIONS CONTAINING SYNERGISTIC BLENDS OF ZINC BORATE AND BARIUM METABORATE PIGMENTS

BACKGROUND OF THE INVENTION

This invention relates to coating compositions and in particular to corrosion resistant primer compositions.

Primer compositions containing borates as corrosion inhibitive pigments are known in the art as shown by Orth, Jr., U.S. Pat. No. 2,809,949, issued Oct. 15, 1957; Russell Jr., U.S. Pat. No. 3,287,142, issued Nov. 22, 1966; Robinson, U.S. Pat. No. 3,380,836, issued Apr. 30, 1968 and Goodell, U.S. Pat. No. 3,829,395, issued Aug. 13, 1974. Thus, the primer compositions disclosed in the aforementioned patents employ borates such as sodium borates, barium borates including barium metaborates, calcium metaborate, and zinc borate as corrosion inhibitive pigments. Moreover, U.S. Pat. No. 3,287,142 to Russell, Jr. discloses a protective coating composition containing a mixture of a metal dust such as powdered zinc or lead and barium borate as corrosion inhibiting pigments. However, none of these prior art patents disclose or suggest that blends of zinc borate and barium metaborate would be particularly efficacious as corrosion inhibiting pigments and in fact in the present state of the art, zinc borate is regarded as the best corrosion inhibitive pigment with the other borates being noted as less effective. Accordingly, it was completely surprising and unexpected in accordance with this invention to find that when blends of zinc borate and barium metaborate are employed a corrosion inhibitive pigments in certain resinous film forming vehicle compositions corrosion resistance was markedly and synergistically enhanced when compared to the same compositions containing zinc borate or barium metaborate alone.

DESCRIPTION OF THE INVENTION

The novel primer compositions of this invention may have a resin vehicle solids content of from about 20 to about 30 percent by weight but preferably 24 to 28 percent by weight of resin vehicle is employed. As indicated, the compositions contain blends of zinc borate-barium metaborate as corrosion inhibitive pigments. The compositions of the invention may have a zinc borate-barium metaborate pigment to resin vehicle solids ratio of from about 40 to 100 to about 90 to 100 with a preferred ratio being from 55 to 100. The ratio of zinc borate to barium metaborate in the corrosion inhibiting pigment blend may be from 10:90 to 95:5 with the preferred zinc borate to barium metaborate ratio being 63:37.

The film forming resinous vehicles utilized in the compositions of this invention can be blends of: (1) an aqueous acrylic latex with an alkyd resin, a styrene allyl alcohol ester adduct, or a polymerized dehydrated castor oil product or (2) a solvent-based epoxy ester resin with a chlorinated paraffin.

The zinc borate and barium metaborate pigments as well as any other desired pigments used in the composition are dispersed in a solution or dispersion of the aforementioned resins by conventional techniques such as sand grinding, ball milling, high speed cowles dispersion and the like to form a mill base. This mill base is then blended with a solution or dispersion of the aforementioned resins to form the coating compositions of this invention. If desired, the composition may be further reduced with conventional solvents and thinners to achieve the desired application viscosity.

The zinc borate pigment utilized in the compositions of the invention has the preferred formula:

$$2\,ZnO \cdot 3\,B_2O_3 \cdot (H_2O)_x$$

in which the water of hydration, $x$ is present in the range of 3.3 $H_2O$ to 3.7 $H_2O$. Preferably, a zinc borate pigment is employed in which the water of hydration is about 3.5 $H_2O$.

The barium metaborate pigment utilized in the compositions of the invention may be any of the commercially available materials presently on the market. A preferred barium metaborate pigment is a barium metaborate designated Busan 11M-1 available from Buckman Laboratories.

As indicated, the film forming resinous vehicle can be a blend of an aqueous acrylic latex with an alkyd resin, a styrene allyl alcohol ester adduct or a polymerized dehydrated castor oil product.

Various acrylic latices may be employed in the resin vehicle. The term "latex" as used herein is a term well known in the art and describes a two-phase system. The first phase is referred to as the continuous phase and is made up essentially of water and at times certain soluble additives to effect various results (e.g., emulsifying agents). A preferred additive is a glycol, such as ethylene or propylene glycol, which improves the flow characteristics of the wet film. The second phase is a distinctly separate phase dispersed in the first phase, referred to as the discontinuous phase since it comprises a plurality of particles of polymeric materials. Although the polymeric particles may be of any conventional size, within the meaning of the term, the particles must form a distinct second phase as opposed to solutions and quasisolutions.

The polymeric particles can be particles of any coalescable acrylic polymer which can be stably dispersed in water. By "coalescable polymer" is meant a polymer which, either alone or in the presence of coalescing aids such as plasticizers or the like, form a continuous film at the temperature of use. Ordinarily, polymers which are coalescable at room temperature are preferred, but others which require heating or particular conditions to provide continuous films can also be employed. Mixtures of polymers, which may or may not be coreactive, are also useful; such mixtures can be either in the same particles or in different particles dispersed in the composition.

Among the acrylic polymers which can be utilized are homopolymers and copolymers of various acrylic monomers such as, for example, alkyl or aryl esters of unsaturated carboxylic acids, including acrylates and methacrylates such as ethyl acrylate, butyl acrylate, 2-ethylhexyl acrylate, methyl methacrylate, phenylacrylate and the like. In addition, acrylic copolymers derived from the aforementioned acrylic monomers and other monomers such as, for example, aliphatic and aromatic monomers such as ethylene, butadiene, styrene and vinyl toluene; vinyl halides, such as vinyl chloride, vinyl bromide and vinylidene chloride; unsaturated nitriles, such as acrylonitrile and methacrylonitrile; unsaturated amides, such as acrylamide, N-substituted acrylamide, and methacrylamide; unsaturated carboxylic acids, such as acrylic acid, methacrylic acid, maleic acid or anhydride, and fumaric acid; and other polymerizable monomers of various types may be utilized.

In some cases preferred acrylic lattices comprise combination of the above monomers, e.g., vinyl acetate-alkyl acrylate copolymers, alkyl acrylate-styrene copolymers and the like.

A particularly preferred acrylic latex employed in the resin vehicle of the compositions of the invention is a commercial acrylic polymer latex derived from a monomer mixture containing 33 percent methyl methacrylate and 67 percent ethyl acrylate designated Rhoplex MV-1 available from the Rhom and Haas Company.

Alkyd resins which may be utilized in the resin vehicle of the compositions of the invention are resins produced by reacting a polyfunctional alcohol, a polyfunctional acid (or acid anhydride) and an oil or oil fatty acid. These resins are variously referred to in the art as oil-modified polyesters or oil-modified alkyds.

Polyfunctional alcohols which can be used in preparing the alkyd resin include glycerine, trimethylolethane, trimethylolpropane, pentaerythritol, sorbitol, mannitol, ethylene glycol, diethylene glycol, and similar polyols. Pentaerythritol is a preferred polyfunctional alcohol.

Polyfunctional acids which can be used in preparing the alkyd include phthalic acid, maleic acid, fumaric acid, isophthalic acid, succinic acid, trimellitic acid, adipic acid, azelaic acid, sebacic acid and the like, as well as the anhydrides of such acids. A preferred polyfunctional acid is isophthalic acid.

The oil employed in preparing the alkyd can be a saturated oil such as coconut oil or a drying or semi-drying oil, such as linseed oil, soya oil, safflower oil, perilla oil, tung oil, oiticica oil, poppyseed oil and the like. The above oils can be used per se or in the form of a fatty acid. A preferred oil employed in the alkyd is soya oil.

A particularly preferred alkyd resin for use in the resin vehicle of the compositions of the invention is a long oil soya alkyd containing soya oil, isophthalic acid, and pentaerythritol.

The alkyd resin is produced by methods well known in the art employing conventional techniques and procedures. Thus, for example, the alkyd can readily be prepared by the simple interaction of a mixture of a polyfunctional alcohol, a polyfunctional acid (or acid anhydride) and a fatty acid. Where the oil per se is employed, it becomes necessary as is well known in the art, to first convert the oil to a mono- or diglyceride by alcoholysis with glycerol before adding the acid or acid anhydride and esterifying. As will be recognized, the type and amounts of the various components which make up the alkyd resin can be varied widely, depending upon the physical characteristics desired in the resin.

As indicated above, the resin vehicle blend in addition to the acrylic latex may also contain a styrene-allyl alcohol ester adduct. Suitable styrene-allyl alcohol ester adducts which can be employed are the reaction products of an allyl or methallyl alcohol, styrene or ring-substituted styrene and unsaturated acid.

The allyl or methallyl alcohol may constitute from 1 to 40 percent by weight of the adduct, the styrene compound may constitute from 30 to 90 percent by weight of the adduct and the unsaturated acid may constitute from 1 to 50 percent by weight of the adduct. The materials comprising the styrene component may be styrene, ring-substituted alkyl styrenes such as ortho, meta, and paramethyl, ethyl, butyl, etc.; styrenes, ortho-para or ortho-meta dimethyl or diethyl styrenes, ring-substituted chlorostyrenes such as the mono-, di-, and trichlorostyrenes, and alkyl chlorostyrenes such as ortho methyl para chlorostyrene. Mixtures of two or more of the styrene compounds may be used. The unsaturated acid component comprises such materials as acrylic acid, methacrylic acid, crotonic acid, cinnamic acid, all of which compounds are alpha, beta-ethylenically unsaturated monocarboxylic acids. Mixtures of these acids may be used.

In preparing these adducts, the three types of monomeric components may be mixed together with or without an organic solvent inert to the reactants. The mixture may contain a free radical polymerization initiator. The mixture is generally heated in a closed pressure-resistant reaction vessel at from 100° to 250° C. under autogenous pressure. The reaction can be run for from 15 to 75 minutes to obtain conversions ranging from 30 to 70 percent depending on the conditions chosen.

The reaction may be carried out in the presence of a free radical polymerization initiator such as ditertiarybutyl peroxide, benzoyl peroxide, tertiarybutyl perbenzoate, pinacolone peroxide, etc. The amount of initiator may vary between 0.1 and 5 parts per 100 parts of monomer mixture.

The products of the polymerization step are generally syrupy liquids which comprise a solution of the adduct in unreacted monomer and solvent if a solvent is used. The adduct is easily recovered from the syrup by removing the unreacted monomer and solvent either by vacuum distillation at temperatures up to 200° C. or by other conventional drying techniques. The adducts are generally hard, colorless, brittle resins containing from about 1 to about 10 percent hydroxyl groups by weight and from about 1 to about 15 percent carboxyl groups by weight.

A particularly preferred styrene-allyl alcohol ester adduct for use in the resin vehicle of the compositions of the invention is an adduct having a solids content of 98.0 percent by weight, a Brookfield viscosity at 25° C. of 12,000–24,000 centipoises and an acid number of 8.4 to 11.2 on solution prepared by reacting a mixture consisting of 34.5 percent styrene, 12.5 percent allyl alcohol, and 53.0 percent tall oil fatty acid available from the Monsanto Corporation under the designation RFO245.

For a more detailed description of the above-described styrene-allyl alcohol ester adducts and their method of preparation, reference can be made to U.S. Pat. No. 2,899,404 to Chapin et al., issued Aug. 11, 1959.

As mentioned above, the resin vehicle may contain in addition to the acrylic latex a polymerized castor oil product. Suitable polymerized castor oil products are known in the art. These polymerized castor oils are obtained by the oxidative polymerization of castor oil (essentially glyceryl tri-ricinoleate) at the double bond which yields a product having increased viscosity, increased compatibility with various resins, decreased solubility in aliphatic solvents and improved ability to wet and disperse pigments. For a more detailed description of these polymerized castor oils and their preparation, see Volume 1, "Organic Coating Technology" by Payne, copyright 1954, at pages 385–386. A preferred polymerized castor oil for use herein is a polymerized dehydrated castor oil having a solids content of 99.9 percent by weight, a Stokes viscosity of 46 at 25° C. and an acid value of 4, available from the Baker Castor Oil Company, Division of NL Industries, under the designation Castung 403-Z₃.

The ratios of acrylic latex solids to alkyd resin, styrene-allyl alcohol ester adduct or polymerized castor oil product solids employed in the resin vehicle blend may range from about 60 percent to about 80 percent by weight of acrylic latex solids and from about 20 percent to about 40 percent by weight of alkyd resin, styrene-allyl alcohol ester adduct or polymerized castor oil solids with a preferred ratio being about 64 percent by weight acrylic latex solids and about 36 percent by weight of alkyd resin, styrene-allyl alcohol ester adduct or polymerized castor oil product solid.

As further indicated, the resin vehicle employed in the primer compositions of the invention can also be a blend of a solvent-based epoxy ester resin with a chlorinated paraffin.

Various epoxy ester resins may be utilized in the resin vehicle blend. Thus, epoxy ester resins prepared by the esterification of an epoxy resin with a dicarboxylic acid or an oil fatty acid may be utilized.

Epoxy resins which can be utilized in preparing the epoxy resin ester include the epoxy resins having the structural formula:

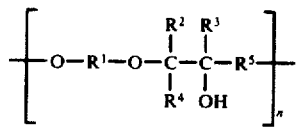

wherein $n$ is an integer sufficient to provide the epoxy resin with a molecular weight of at least about 500 and up to about 4,000 R1 is a divalent aromatic radical, $R^2$, $R^3$ and $R^4$ are individually selected from the group of hydrogen and an alkyl group having 1-5 carbon atoms, $R^1$ as shown above, can be a bisphenol A or a bisphenol F, both of which can be substituted. Bisphenol A is para, para-isopropylidene diphenol and bisphenol F is r, r'-dihydroxydiphenyl methane. Suitable substituents for these compounds include alkyls having 1-5 carbon atoms, halogens, such as chlorine, bromine and fluorine, and alkoxy groups having 1-5 carbon atoms.

One preferred epoxy resin is the reaction product of epichlorohydrin and bisphenol A which has the repeating structural formula:

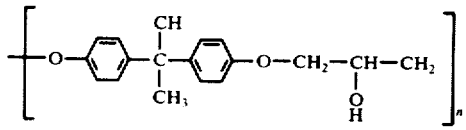

where $n$ is the same as above. Epichlorohydrin and bisphenol A polymer is preferred because it readily forms coatings which have a balance of desired physical properties, such as high tensile strength, excellent solvent resistance and excellent adhesion to substrates and to acrylic lacquers or enamel topcoats.

Another very useful epoxy resin is the reaction product of epichlorohydrin and bisphenol F which has the repeating structural formula:

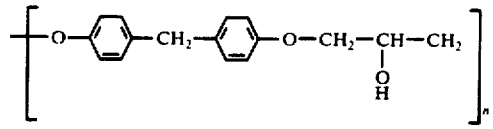

where $n$ is as defined above.

The dicarboxylic acid which may be used to prepare the epoxy ester resin may be represented by the general formula:

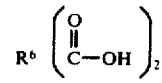

where $R^6$ is a divalent organic radical. Also, blends of dicarboxylic acids and anhydrides of dicarboxylic acids can be utilized. Typical dicarboxylic acids that can be used to prepare the polymer are, for example, aromatic dicarboxylic acids, aliphatic dicarboxylic acids, alicyclic dicarboxylic acids, or a mixture of any of these acids and anhydrides of these acids. Typical saturated aliphatic dicarboxylic acids are succinic, glutaric, adipic, pimelic, suberic, azelaic, brassic, dodecanedoic and the like; alicyclic dicarboxylic acids are, for example, hexahydroterephthalic acid, tetrahydroisophthalic acid, tetrahydroterephthalic acid, hexahydrophthalic acid, tetrahydrophthalic acid; typical aromatic dicarboxylic acids are isophthalic acid, terephthalic acid, 1,5-naphthalene dicarboxylic acid, 2,2'-dibenzoic dicarboxylic acid, 2,2'-isopropylidene dibenzoic acid, 2,2'-ketodibenzoic acid, oxydibenzoic acid, 2,2'-sulfondibenzoic acid, and the like.

Up to 15% weight monobasic acids can be utilized in preparing the epoxy ester, such as benzoic acid, acetic acid, propionic acid, caproic acid, pelargonic acid, lauric acid, palmetic acid, stearic acid and the like. As indicated, oil fatty acids such as tung oil, tall oil, linseed oil, soya oil, dehydrated castor oil, can also be utilized in preparing the epoxy ester resin.

One preferred epoxy ester resin is an esterification product of an epoxy resin of epichlorohydrin and bisphenol A and soya oil fatty acids.

The epoxy ester resin may contain (or be formed from) about 40 to about 60 percent by weight of the epoxy resin and from about 40 to about 60 percent by weight of the dicarboxylic acid or oil fatty acid.

The above-described epoxy ester resins are prepared by utilizing esterification techniques which are well known and conventional in the polyester art. The resultant epoxy ester resins may then be thinned or the resin dissolved in organic solvents typically used in the polyester or alkyd resins such as for example, aliphatic or aromatic hydrocarbons, mineral spirits, and the like.

As indicated, the above-described epoxy ester resin is combined with a chlorinated paraffin to form the resin vehicle blend. Chlorinated paraffins which may be utilized are the chlorinated paraffin waxes particularly those having a chlorine content of up to about 50 percent. Such chlorinated paraffin waxes are known in the art as shown in the publication entitled "The Science of Surface Coatings" by Chatfield, copyright, 1962, at page 294.

When epoxy ester resins and chlorinated paraffins are utilized in the resin vehicle, the vehicle may contain from about 85 percent to about 95 percent by weight of the epoxy ester resin and correspondingly from about 5 to about 15 percent by weight of the chlorinated paraffin.

In addition to the resin vehicle blends and corrosion inhibitive pigment blends described above, the primer compositions of the invention may contain various other optional additives and adjuvants commonly utilized in coating compositions. For example, the compositions may contain conventional pigments such as titanium dioxide, dyes, various fillers, plasticizers, antioxidants, flow control agents, and other such formulating additives.

The compositions herein can be applied by any conventional method including brushing, dipping, flow coating, roller coating, spraying and the like.

The primer compositions herein are cured by air drying at ambient temperature. As will be evident, primer compositions which dry in air at ambient temperature are of considerable advantage in that they provide a significant energy savings in comparison to primers which require elevated temperatures for curing.

The following examples are submitted to further illustrate the nature of the present invention and should not be considered as a limitation on the scope thereof. All parts and percentages in the examples and throughout the specification are by weight unless otherwise specified.

EXAMPLES 1-3

These examples illustrate the synergistic effect achieved by utilizing a blend of zinc borate and barium metaborate as corrosion inhibitive pigments. In the examples, a control primer composition was prepared by admixing zinc borate pigment with a film-forming resin vehicle blend of an acrylic latex and an alkyd resin (Example 1). Test compositions were then prepared by admixing a blend of zinc borate and barium metaborate with the same resin vehicle blend (Example 2) and barium metaborate alone with the same resin vehicle blend (Example 3). In these compositions, the total pigment to resin vehicle solids ratio was maintained at the same level. The resultant primer compositions had the following formulations:

| Ingredients | Parts by Weight | | |
|---|---|---|---|
| | Example No. 1 | No. 2 | No. 3 |
| Resin Vehicle | | | |
| (acrylic latex[1] | 155.4 | 155.4 | 155.4 |
| (soya alkyd resin[2] | 89.4 | 89.4 | 89.4 |
| Zinc borate pigment[3] | 135.0 | 85.0 | — |
| Barium metaborate | — | 50.0 | 135.0 |

[1]An acrylic polymer latex, having a solids content of 46 percent and a Brookfield viscosity range of 300-1500 centipoises prepared from a monomer mixture containing 33 percent by weight methyl methacrylate and 67 percent by weight ethyl acrylate, available commercially from the Monsanto Corporation under the designation Rhoplex MV-1.
[2]A long oil soya alkyd resin, having a solids content of 98.0 percent by weight, a Gardner-Holdt viscosity at 25° C. of X-Z and an acid number of 5-9 on solution, prepared by esterification of a mixture containing 78.0 percent soya oil, 17.0 percent isophthalic acid and 8.0 percent pentaerithrytol.
[3]Zinc borate pigment having the formula: 2 ZnO . 3 $B_2O_3$ . 3.5 $H_2O$.

The above primer compositions were evaluated for corrosion resistance and adhesion, utilizing the following procedure:

The primer compositions were applied over untreated cold-rolled steel panels using a 0.006 inch Bird applicator commonly referred to as a 6 mil drawdown bar. The coated steel panels were permitted to air dry at ambient temperature and then scribed and subjected to a salt spray test as standardized in the ASTM B117-64 salt fog test procedure (5 percent sodium chloride solution) for 360 hours. Then, the panels were removed from the salt spray apparatus and flushed with cold water to remove residual salt from the panel surface. After the panels were permitted to air dry for about one hour, the right half of the test panel was taped with a 2-inch masking tape. The tape was then rapidly removed to test film adhesion. Then, the substrate corrosion was determined by stripping the coated film from the untaped portion of the panel to the bare metal. The corrosion resistance of the film was determined by visually observing the stripped portion of each test panel for corrosion effects (e.g., pitting, rusting, etc.) and then assigning a rating thereto. The rating as indicated is based upon corrosion resistance. Accordingly, where a primer composition is assigned a rating of better, slightly better, much better, etc. it means that the stripped panels exhibited less corrosion whereas a rating of worse or much worse means that the composition exhibited more corrosion than the control. In rating the adhesion of films of the test compositions, the terms better, much better, etc., or worse, much worse, etc. means that the film adhesion is either better or worse as the case may be than the control. Based upon this test procedure, the primer compositions of these examples were rated as shown in Table I.

TABLE I

| Example No. | Corrosion Resistance | Adhesion | Overall Rating |
|---|---|---|---|
| 1 (control) | Par | Par | Par |
| 2 | Much better | Much better | Much better |
| 3 | Much worse | Much worse | Much worse |

EXAMPLES 4-6

These examples illustrate the synergistic effect on corrosion resistance of a primer composition achieved by utilizing the zinc borate-barium metaborate pigment blend in a resin vehicle consisting of a blend of an acrylic latex and a styrene-allyl alcohol ester adduct. The primer compositions of these examples had the following formulation:

| Ingredients | Parts by Weight | | |
|---|---|---|---|
| | Example No. 4 | No. 5 | No. 6 |
| Resin Vehicle | | | |
| (acrylic latex, of Ex's. 1-3 | 155.4 | 155.4 | 155.4 |
| (styrene-allyl alcohol ester adduct[1] | 89.4 | 89.4 | 89.4 |
| Zinc Borate Pigment of Ex's. 1-3 | 135.0 | 85.0 | — |
| Barium metaborate | — | 50.0 | 135.0 |

[1]A styrene-allyl alcohol ester adduct, having a solids content of 98.0 percent by weight, a Brookfield viscosity at 25° C. of 12,000-24,000 centipoises and an acid number of 8.4 to 11.2 on solution prepared by reacting a mixture consisting of 34.5 percent styrene, 12.5 percent allyl alcohol, and 53.0 percent tall oil fatty acid available from the Monsanto Corporation under the designation RF0245.

The above primer compositions were applied to steel panels and tested for corrosion resistance and adhesion utilizing the procedure set forth in Examples 1-3. Test results are shown in Table II.

TABLE II

| Example No. | Corrosion Resistance | Adhesion | Overall Rating |
|---|---|---|---|
| 4 (control) | Par | Par | Par |
| 5 | Equal to, slightly worse | Much better | Better |
| 6 | Much worse | Much worse | Much worse |

EXAMPLES 7-9

These examples further illustrate the synergistic effect of the blend of zinc borate-barium metaborate pigments in primer compositions utilizing a resin vehicle containing an acrylic latex and a polymerized dehydrated castor oil product. The primer compositions of these examples had the following formulations:

| Ingredients | Parts By Weight | | |
|---|---|---|---|
| | Example No. 7 | No. 8 | No. 9 |
| Resin Vehicle | | | |
| (acrylic latex of Examples 1-3 | 155.4 | 155.4 | 155.4 |
| (polymerized dehydrated castor oil[1] | 89.4 | 89.4 | 89.4 |
| Zinc borate pigment of Examples 1-3 | 135.0 | 85.0 | — |
| Barium metaborate | — | 50.0 | 135.0 |

The above compositions were evaluated for corrosion resistance and adhesion utilizing the procedure of Examples 1-6. Test results are shown in Table III.

TABLE III

| Example No. | Corrosion Resistance | Adhesion | Overall Rating |
|---|---|---|---|
| 7 (control) | Par | Par | Par |
| 8 | Better | Equal | Better |
| 9 | Very much worse | Very much worse | Very much worse |

[1] A polymerized dehydrated castor oil product having a solids content of 99.9

TABLE III-continued

| Example No. | Corrosion Resistance | Adhesion | Overall Rating |
|---|---|---|---| percent by weight, a Stokes viscosity of 46 at 25° C. and an acid value of 4, available from the Baker Castor Oil Company, Division of NL Industries, under the designation Castung 403-Z).

EXAMPLES 10-18

These examples illustrate the effect on primer compositions of varying the ratios of zinc borate to barium metaborate in the pigment blend.

The primer compositions utilized in these examples had the following formulations:

| Ingredients | Parts By Weight | | | | | | | | |
|---|---|---|---|---|---|---|---|---|---|
| Example No. | 10 | 11 | 11 | 13 | 14 | 15 | 16 | 17 | 18 |
| Resin Vehicle | | | | | | | | | |
| (acrylic latex of Examples 1-3 | 155.4 | 155.4 | 155.4 | 155.4 | 155.4 | 155.4 | 155.4 | 155.4 | 155.4 |
| (alkyd resin of Examples 1-3 | 89.4 | 89.4 | 89.4 | 89.4 | 89.4 | 89.4 | 89.4 | 89.4 | 89.4 |
| Zinc borate pigment of Examples 1-3 | 135.0 | 128.3 | 114.7 | 101.2 | 85.0 | 67.5 | 33.8 | 13.5 | 0 |
| Barium metaborate | — | 6.7 | 20.3 | 33.8 | 50.0 | 67.5 | 10.12 | 121.5 | 135.0 |

The above primer compositions were evaluated for corrosion and adhesion utilizing the procedure of Examples 1-3. Test results are shown in Table IV.

TABLE IV

| Example No. | Corrosion Resistance | Adhesion | Overall Rating |
|---|---|---|---|
| 10 | Par | Par | Par |
| 11 | Much better | Slightly worse | Better |
| 12 | Much better | Slightly worse | Better |
| 13 | Much better | Slightly worse | Better |
| 14 | Very much better | Very much better | Very much better |
| 15 | Very much better | Equal | Much better |
| 16 | Much better | Much better | Much better |
| 17 | Better | Much better | Better |
| 18 | Worse | Much worse | Much worse |

EXAMPLES 19-21

These examples illustrate the synergistic effect achieved by adding the zinc borate-barium metaborate pigment blends of the invention to a solvent-based primer composition comprising an epoxy ester resin and a chlorinated paraffin. The primer compositions were prepared as in Examples 1-3 and had the following formulations:

| Ingredients | Parts By Weight | | |
|---|---|---|---|
| | Example No. 19 | 20 | 21 |
| Resin Vehicle | | | |
| (Epoxy ester resin [1] | 470.0 | 470.0 | 470.0 |
| (Chlorinated paraffin [2] | 30.0 | 30.0 | 30.0 |
| Zinc Borate of Examples 1-3 | 232.5* | 186.0* | — |
| Barium metaborate | — | 57.0* | 285.0* |

[1] A 50 percent solids solution of an epoxy ester resin in a solvent mixture consisting of 97.9 percent mineral spirits and 2.1 percent ethyl benzene, said resin having a Gardner-Holdt viscosity of L-O and an acid number of 6-10 formed from a reaction mixture containing 53.8 percent by weight of a soya oil fatty acid and 42.6 percent by weight of an epoxy resin of epichlorohydrin-Bisphenol A having an acid number of 6-10 and a Gardenr-Holdt Color of 7 Max.

[2] A chlorinated paraffin wax having a solids content of 100.0 %, a chlorine content of 41.5% and a Brookfield viscosity of 27,000 centipoises at 25° C. available from Nevelle Chemical Co. under the designation Unichlor 40.

*Based on parts by volume, the formulation contains equivalent volumes of inhibitive pigment.

The above compositions were tested for corrosion resistance and adhesion utilizing the procedures set forth in Examples 1-3. Test results are shown in Table V.

TABLE V

| Example No. | Corrosion Resistance | Adhesion | Overall Rating |
|---|---|---|---|
| 19 (control) | Par | Par | Par |
| 20 | Much better | Much better | Much better |
| 21 | Much worse | Much worse (very poor) | Much worse |

The above examples clearly illustrate that the zinc borate-barium metaborate pigment blends of the primer compositions of the invention produce synergistic effects on the corrosion resistance and adhesion of films formed from the compositions. Thus, it is clearly illustrated that these pigment blends produce greater corrosion resistance and adhesion than either the zinc borate or barium metaborate pigments alone.

We claim:

1. A corrosion resistant primer composition comprising:
   a. a film forming resin vehicle blend consisting essentially of:
      1. from about 60 percent to about 80 percent by weight solids of an acrylic polymer latex and from about 20 percent to about 40 percent by weight solids of an alkyd resin, styrene-allyl alcohol ester adduct or a polymerized dehydrated castor oil; or
      2. from about 85 percent to about 95 percent by weight solids of an epoxy ester resin and from about 5 to about 15 percent by weight solids of a chlorinated paraffin; and
   b. a pigment blend consisting of from 10 to 95 percent by weight of zinc borate and from 5 to 90 percent by weight of barium metaborate, wherein said zinc borate has the formula:

$$2 ZnO \cdot 3 B_2O_3 \cdot (H_2O)_x$$

wherein $x$ is from 3.3 to 3.7 and wherein the ratio of said pigment blend to said resin vehicle solids is from about 40:100 to about 90:100.

2. The composition of claim 1 wherein said acrylic latex is an acrylic polymer latex derived from a monomer mixture containing 33 percent methyl methacrylate and 67 percent ethyl acrylate.

3. The composition of claim 1 wherein said alkyd resin is a soya oil alkyd resin of soya oil, isophthalic acid and pentaerythritol.

4. The composition of claim 1 wherein said styrene-allyl alcohol ester adduct is an adduct of styrene, allyl alcohol and tall oil fatty acid.

5. The composition of claim 1 wherein said epoxy ester resin is an ester of an epoxy resin of epichlorohydrin-bisphenol A and a soya oil fatty acid.

6. The composition of claim 1 wherein said resin vehicle comprises from about 20 to about 30 percent by weight solids of the composition.

7. The composition of claim 1 wherein said zinc borate pigment has the formula:

$$2 ZnO \cdot 3 B_2O_3 \cdot 3.5 H_2O.$$

8. The composition of claim 1 wherein the ratio of zinc borate to barium metaborate in said pigment blend is 63:37.

9. An inhibitive pigment blend consisting of from about 10 to about 95 percent by weight zinc borate and from about 5 to about 90 percent by weight barium metaborate.

10. The inhibitive pigment blend of claim 9 containing 63 percent by weight of zinc borate and 37 percent by weight of barium metaborate.